United States Patent
Barry et al.

(10) Patent No.: US 9,909,532 B2
(45) Date of Patent: Mar. 6, 2018

(54) EXHAUST LINER FLANGE COOLING

(71) Applicant: United Technologies Corporation, Hartford, CT (US)

(72) Inventors: Thomas M. Barry, East Hampton, CT (US); George J. Kramer, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 246 days.

(21) Appl. No.: 14/761,020

(22) PCT Filed: Feb. 11, 2014

(86) PCT No.: PCT/US2014/015748
§ 371 (c)(1),
(2) Date: Jul. 15, 2015

(87) PCT Pub. No.: WO2014/126899
PCT Pub. Date: Aug. 21, 2014

(65) Prior Publication Data
US 2015/0369173 A1   Dec. 24, 2015

Related U.S. Application Data

(60) Provisional application No. 61/765,735, filed on Feb. 17, 2013.

(51) Int. Cl.
*F02K 1/00* (2006.01)
*F02K 1/82* (2006.01)
(Continued)

(52) U.S. Cl.
CPC ............. *F02K 1/822* (2013.01); *F02C 3/04* (2013.01); *F02C 3/14* (2013.01); *F02C 7/14* (2013.01);
(Continued)

(58) Field of Classification Search
CPC ... F02K 1/80; F02K 1/82; F02K 1/822; F02K 1/8225; B64D 33/04
See application file for complete search history.

(56) References Cited

U.S. PATENT DOCUMENTS 5,593,277 A * 1/1997 Proctor .................. F01D 11/18
415/115
5,996,936 A    12/1999 Mueller
(Continued)

FOREIGN PATENT DOCUMENTS

EP    0660046 A1    6/1995
EP    1882822 A2    1/2008
(Continued)

OTHER PUBLICATIONS

Supplementary European Search Report for European Application No. 14751277.6 dated Feb. 9, 2016.
(Continued)

*Primary Examiner* — Pascal M Bui Pho
*Assistant Examiner* — Katheryn Malatek
(74) *Attorney, Agent, or Firm* — Carlson, Gaskey & Olds, P.C.

(57) ABSTRACT

A liner portion has an exhaust liner portion with an inner face extending to an outward extending flange. Cooling grooves formed in the flange have a radially outward inlet point and a radially inner outlet point. A flow area at the inlet point is smaller than the flow area at the outlet point.

12 Claims, 2 Drawing Sheets

(51) Int. Cl.
*F02K 1/80* (2006.01)
*F23R 3/00* (2006.01)
*F02C 3/04* (2006.01)
*F02C 3/14* (2006.01)
*F02C 7/14* (2006.01)
*F02C 7/18* (2006.01)

(52) U.S. Cl.
CPC .................. *F02C 7/18* (2013.01); *F02K 1/80* (2013.01); *F23R 3/002* (2013.01); *F05D 2220/32* (2013.01); *F05D 2250/28* (2013.01); *F05D 2250/294* (2013.01); *F05D 2250/324* (2013.01); *F05D 2260/202* (2013.01); *Y02T 50/675* (2013.01)

(56) References Cited

U.S. PATENT DOCUMENTS 6,287,075 B1  9/2001  Kercher
2004/0123460 A1  7/2004  Haggander et al.
2009/0019857 A1*  1/2009  Tisdale .................. F02K 1/386
                                                  60/770
2011/0315789 A1*  12/2011  Bachman .................. F23R 3/18
                                                  239/265.17
2012/0207584 A1  8/2012  Lavin et al.

FOREIGN PATENT DOCUMENTS

JP   2006097981   4/2006
WO   2008113248   9/2008

OTHER PUBLICATIONS

The International Search Report and Written Opinion for PCT Application No. PCT/US2014/015748, dated May 15, 2014.
International Preliminary Report on Patentability for International Application No. PCT/US2014/015748 dated Aug. 27, 2015.

* cited by examiner

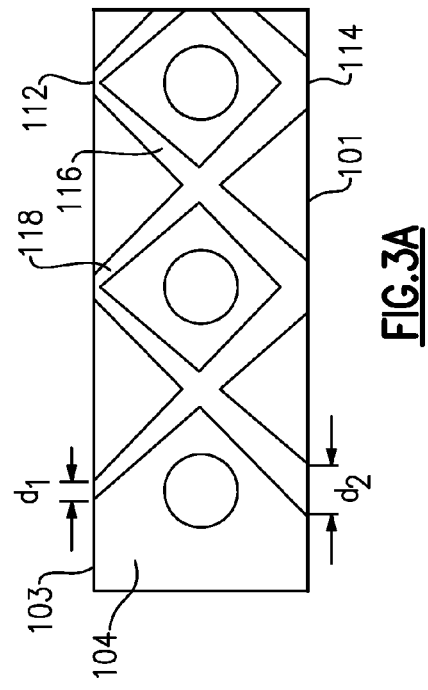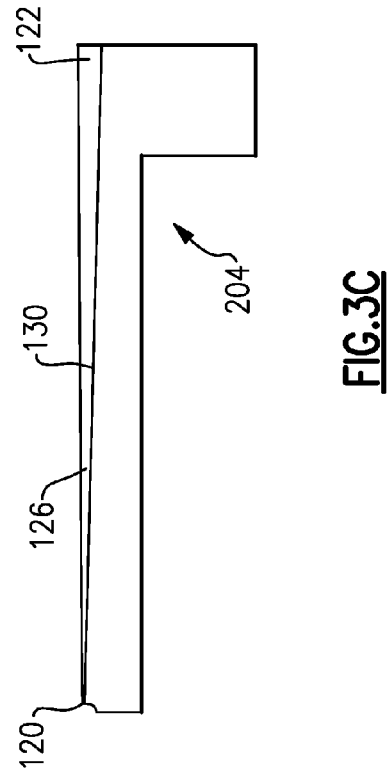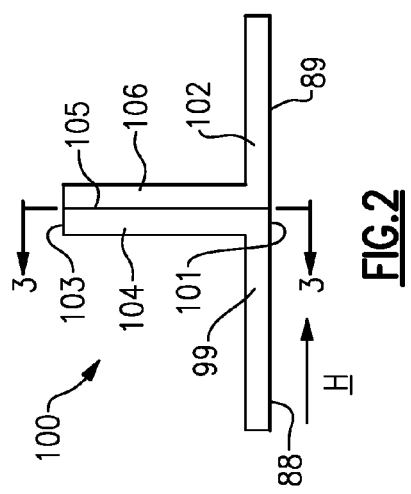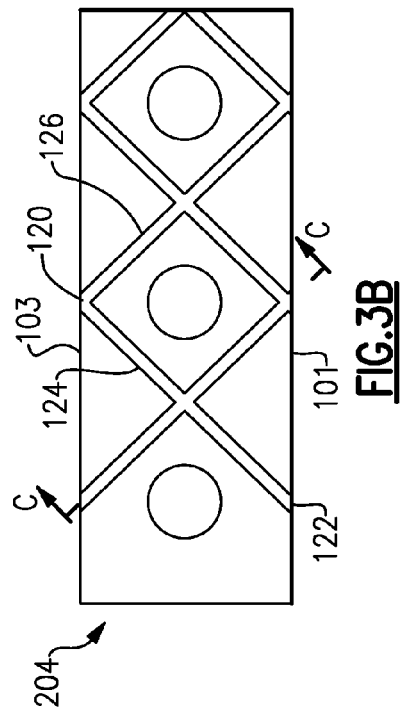

EXHAUST LINER FLANGE COOLING

This application claims priority to U.S. Provisional Application No. 61/765,735, filed Feb. 17, 2013.

BACKGROUND OF THE INVENTION

This application relates to a cooling scheme for cooling flanges between adjacent liner portions for an exhaust liner in a gas turbine engine.

Gas turbine engines are known and, typically, include a fan delivering air into a compressor. The air is compressed in the compressor and delivered into a combustion section where it is mixed with fuel and ignited. Products of this combustion pass downstream over turbine rotors, driving them to rotate.

Downstream of the turbine rotors, the products of combustion exit through an exhaust nozzle. The products of combustion are still quite hot and exhaust liners are provided to insulate against the high temperatures.

In some gas turbine engines, an augmentor is included adjacent to the exhaust nozzle and fuel is injected into the products of combustion to create a second combustion zone. The augmentors result in extremely high temperatures at the exhaust nozzle. Exhaust liners are also used in this type engine.

The exhaust liners, typically, include a plurality of axially spaced portions that have flanges in abutting contact.

The flanges can result in heat gradients as a radially outer end of the flange is spaced further from the products of combustion than are the radially inner end. Thus, it is known to direct cooling air at an interface between the abutting flanges.

However, the cooling air will exit an area at the radially inner end and can disrupt film cooling that is provided along a radially inner surface of the exhaust liner portions.

SUMMARY OF THE INVENTION

In a featured embodiment, a liner portion has an exhaust liner portion with an inner face extending to a radially outwardly extending flange. Cooling grooves are formed in the radially outwardly extending flange, and have a radially outward inlet point, a radially inner outlet point. A flow area at the inlet point is smaller than a flow area at the outlet point.

In another embodiment according to the previous embodiment, the cooling grooves extend for a circumferential width. A width at the inlet point is less than a width at the outlet point.

In another embodiment according to any of the previous embodiments, the cooling grooves extend from a radially outer inlet point to a radially inner outlet. A depth is defined into a plane of the flange. The depth is less at the inlet point than it is at the outlet point.

In another embodiment according to any of the previous embodiments, the depth increases along a generally linear slope from the inlet point to the outlet point.

In another embodiment according to any of the previous embodiments, there is a plurality of cooling grooves, with some of the cooling grooves extending in one circumferential direction and others of the cooling grooves extending in an opposed circumferential direction.

In another embodiment according to any of the previous embodiments, a pair of cooling grooves start at a common one of the inlet points and a pair of the cooling grooves extend to a common one of the outlet points.

In another featured embodiment, an exhaust liner has a first and second liner portion. The first and second liner portions have radially inner liner faces extending to radially outwardly extending flanges. The first and second liner portions have their flanges in abutting contact. Cooling grooves are formed in at least one of the radially outwardly extending flanges and cooling grooves with a radially outward inlet point, and a radially inner outlet point. A flow area at the inlet point is smaller than a flow area at the outlet point.

In another embodiment according to the previous embodiment, the cooling grooves extend for a circumferential width. A width at the inlet point is less than a width at the outlet point.

In another embodiment according to any of the previous embodiments, the cooling grooves extend from a radially outer inlet point to a radially inner outlet. A depth is defined into a plane of the flange. The depth is less at the inlet point than at the outlet point.

In another embodiment according to any of the previous embodiments, the depth increases along a generally linear slope from the inlet point to the outlet point.

In another embodiment according to any of the previous embodiments, there is a plurality of cooling grooves with some of the cooling grooves extending in one circumferential direction and other cooling grooves extending in an opposed circumferential direction.

In another embodiment according to any of the previous embodiments, a pair of cooling grooves start at a common one of the inlet points and a pair of the cooling grooves extend to a common one of the outlet points.

In another featured embodiment, a gas turbine engine has a combustor, and a turbine section downstream of the combustor. An exhaust liner is downstream of the turbine section, and has a first and second liner portion with radially inner faces extending to radially outwardly extending flanges. The first and second liner portion have their flanges in abutting contact. Cooling grooves are formed in at least one of the radially outwardly extending flanges. The cooling grooves have a radially outward inlet point, and a radially inner outlet point. A flow area at the inlet point is smaller than a flow area at the outlet point.

In another embodiment according to the previous embodiment, the cooling grooves extend for a circumferential width. A width at the inlet point is less than a width at the outlet point.

In another embodiment according to any of the previous embodiments, the cooling grooves extend from a radially outer inlet point to a radially inner outlet. A depth is defined into a plane of the flange. The depth is less at the inlet point than is a depth at the outlet point.

In another embodiment according to any of the previous embodiments, the depth increases along a generally linear slope from the inlet point to the outlet point.

In another embodiment according to any of the previous embodiments, there is a plurality of cooling grooves with some of the cooling grooves extending in one circumferential direction and other cooling grooves extending in an opposed circumferential direction.

In another embodiment according to any of the previous embodiments, a pair of said cooling grooves start at a common one of the inlet points and a pair of cooling grooves extend to a common one of the outlet points.

In another embodiment according to any of the previous embodiments, the engine including an augmentor.

These and other features may be best understood from the following drawings and specification.

BRIEF DESCRIPTION OF THE DRAWINGS

FIG. 2 schematically shows a portion of an exhaust liner.

FIG. 3A shows a first embodiment along line 3-3 of FIG. 2.

FIG. 3B shows a second embodiment along the line 3-3 of FIG. 2.

FIG. 3C is a cross-section along the line C-C of FIG. 3B.

DETAILED DESCRIPTION

Figure 1:
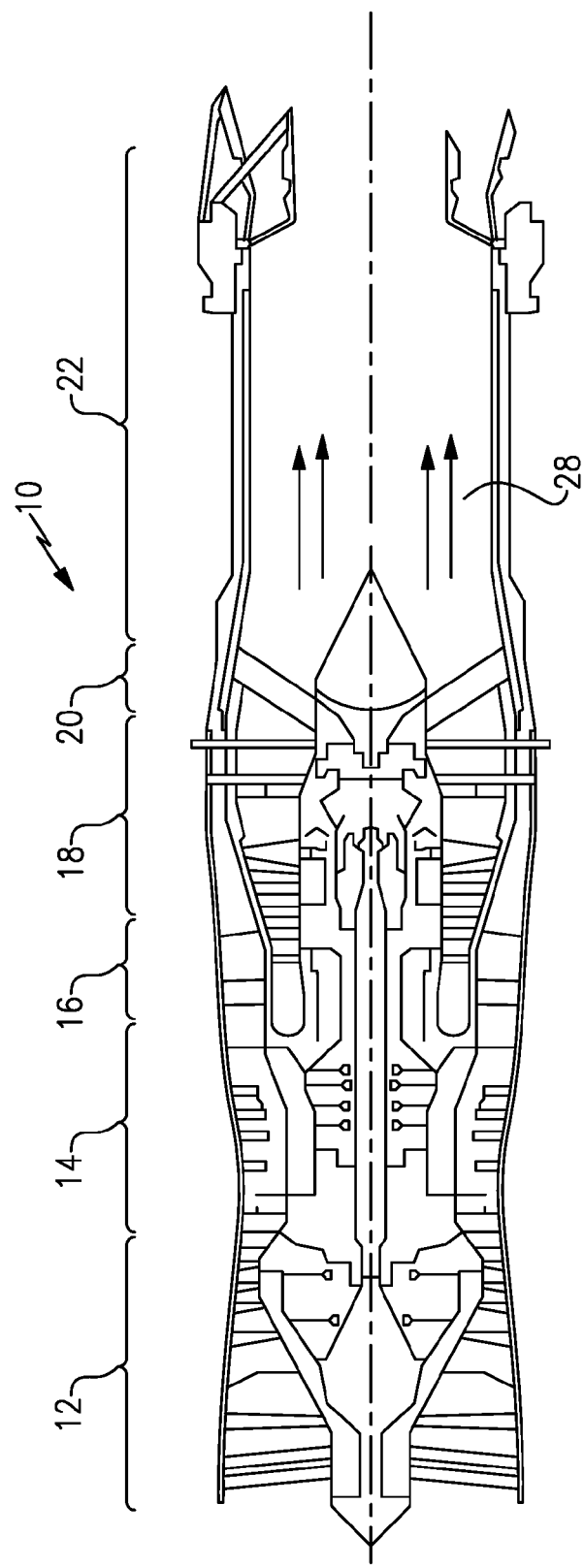
FIG. 1 schematically shows a gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

FIG. 2 shows an exhaust liner 100, somewhat schematically. The exhaust liner 100 can be utilized as part of the exhaust liner assembly 22 of FIG. 1. The FIG. 1 shows a typical engine for military applications. On the other hand, the exhaust liner 100 can also be utilized in a commercial gas turbine engine.

The exhaust liner 100 has a first liner portion 99 adjacent to a second liner portion 102. The two liner portions 99 and 102 have flanges 104 and 106, respectively, that are in abutting contact. The flanges 104 and 106 extend radially outwardly of radially inner faces 88 and 89. An interface 105 between the flanges 104 and 106 receives cooling air. The cooling air is desirable as a radially outer end 103 of the flanges 104 and 106 is spaced further from the products of combustion H than is a radially inner end 101.

As shown in FIG. 3A, the cooling at the interface 105 may be provided by cooling grooves 116 and 118. As shown, the grooves 116 and 118 extend from an upper end, or inlet point 112 to a lower end, or outlet point 114. As shown, the grooves 116 extend in one circumferential direction and the grooves 118 extend in an opposed circumferential direction. At least some of the grooves 116 and 118 start from a common inlet point 112, and extend to a common outlet point 114.

The inlet points 112 have a smaller inlet area than do the outlet points 114. As shown, the inlet area in the embodiment liner portion 104 may be defined by a circumferential width $d_1$ while the outlet area is defined, in part, by a width $d_2$. The $d_2$ is greater than $d_1$ as shown in FIG. 3A.

Since the exit area at outlet point 114 is greater than the inlet area at inlet point 112, the pressure of the cooling air drops dramatically as it passes along the grooves 116 and 118. Thus, when the air exits the outlet points 114, it will not disrupt the film cooling along the interface 101 as much as in the prior art.

FIG. 3B shows a second embodiment flange 204. As shown in embodiment 204, the grooves 124 and 126 extend from an inlet point 120 to an outlet point 122.

As shown in FIG. 3C, a depth into the flange 204 increases from the inlet point 120 to the outlet point 122. In one embodiment, the depth of the bottom surface 130 increases along a generally linear slope from the inlet points 120 to the outlet points 122. Of course, the increase need not be linear. Thus, a bottom surface 130 of the grooves 124 and 126 increases such that there is a greater flow area at outlet point 122 than exists at inlet point 120. This will reduce the pressure, similar to the first embodiment.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A liner portion comprising:
an exhaust liner portion having an inner face extending to a radially outwardly extending flange;
cooling grooves formed in said radially outwardly extending flange, and each of said cooling grooves having a radially outward inlet point, and a radially inner outlet point, and a flow area at said radially outward inlet point being smaller than a flow area at said radially inner outlet point;
a plurality of said cooling grooves, with a first group of said plurality of cooling grooves extending in one circumferential direction and a second group of said plurality of cooling grooves extending in an opposed circumferential direction; and
a first pair of said plurality of cooling grooves starting at a common one of said radially outward inlet points and a second pair of said plurality of cooling grooves extending to a common one of said radially inner outlet points with each of said first and second pairs of said plurality of cooling grooves including one of said first group and one of said second group of said plurality of cooling grooves.

2. The liner portion as set forth in claim 1, wherein said plurality of cooling grooves extend for a circumferential width and a width at said radially outward inlet point is less than a width at said radially inner outlet point.

3. The liner portion as set forth in claim 1, wherein a depth of said plurality of cooling grooves being defined into a plane of said radially outwardly extending flange, and said depth being less at said radially outward inlet point than at said radially inner outlet point.

4. The liner portion as set forth in claim 3, wherein said depth increases along a linear slope from said radially outward inlet point to said radially inner outlet point.

5. An exhaust liner comprising:
a first and a second liner portion, said first and second liner portions each having a respective radially inner liner face extending to a radially outwardly extending flange, and said first and second liner portions having said radially outwardly extending flanges in abutting contact;
cooling grooves formed in at least one of said radially outwardly extending flanges and each of said cooling grooves having a radially outward inlet point, and a radially inner outlet point, and a flow area at said radially outward inlet point being smaller than a flow area at said radially inner outlet point;
wherein a depth of said plurality of cooling grooves being defined into a plane of said at least one of said radially outwardly extending flanges, and said depth being less at said radially outward inlet point than at said radially inner outlet point; and wherein said depth increases along a linear slope from said radially outward inlet point to said radially inner outlet point.

6. The exhaust liner as set forth in claim 5, wherein there being a plurality of said cooling grooves with a first group of said plurality of cooling grooves extending in one circumferential direction and a second group of said plurality of cooling grooves extending in an opposed circumferential direction.

7. The exhaust liner as set forth in claim 6, where a first pair of said plurality of cooling grooves start at a common one of said radially outward inlet points and a second pair of said plurality of cooling grooves extend to a common one of said radially inner outlet points with each of said first and second pairs of said plurality of cooling grooves including one of said first group and one of said second group of said plurality of cooling grooves.

8. A gas turbine engine comprising:
a combustor, and a turbine section downstream of the combustor; and
an exhaust liner downstream of the turbine section, the exhaust liner having a first and a second liner portion, said first and second liner portions each having a respective radially inner face extending to a radially outwardly extending flange, and said first and second liner portions having said radially outwardly extending flanges in abutting contact, cooling grooves formed in at least one of said radially outwardly extending flanges and said cooling grooves having a radially outward inlet point, and a radially inner outlet point, and a flow area at said radially outward inlet point being smaller than a flow area at said radially inner outlet point;

wherein a first group of said plurality of cooling grooves extending in one circumferential direction and a second group of said plurality of cooling grooves extending in an opposed circumferential direction; and where a first pair of said plurality of cooling grooves start at a common one of said radially outward inlet points and a second pair of said plurality of cooling grooves extend to a common one of said radially inner outlet points with each of said first and second pairs of said plurality of cooling grooves including one of said first group and one of said second group of said plurality of cooling grooves.

9. The gas turbine engine as set forth in claim 8, wherein said cooling grooves extend for a circumferential width and a width at said radially outward inlet point is less than a width at said radially inner outlet point.

10. The gas turbine engine as set forth in claim 8, wherein a depth of said plurality of cooling grooves being defined into a plane of said at least one of said radially outwardly extending flanges, and said depth being less at said radially outward inlet point than is a depth at said radially inner outlet point.

11. The gas turbine engine as set forth in claim 10, wherein said depth increases along a linear slope from said radially outward inlet point to said radially inner outlet point.

12. The gas turbine engine as set forth in claim 8, wherein said gas turbine engine includes an augmentor.

* * * * *